United States Patent

[11] 3,547,242

[72] Inventor George R. Braggins
Virginia Water, England
[21] Appl. No. 760,937
[22] Filed Sept. 19, 1968
[45] Patented Dec. 15, 1970
[73] Assignee The Ceewrite Indicator Manufacturing Company Limited
Ashford, Middlesex, England
[32] Priority June 20, 1968
[33] Great Britain
[31] No. 29,433/68

[54] TORQUE LIMITING DEVICES OR OVERLOAD CLUTCHES
12 Claims, 5 Drawing Figs.
[52] U.S. Cl. .................................................. 192/56
[51] Int. Cl. ......................................... F16d 43/20
[50] Field of Search .......................................... 192/56, 150; 81/52.4

[56] References Cited
UNITED STATES PATENTS
2,859,846 11/1958 Shappell .................... 192/56

FOREIGN PATENTS
554,046 7/1932 Germany .................... 192/56

Primary Examiner—Allan D. Herrmann
Attorney—Woodhams, Blanchard and Flynn

ABSTRACT: A torque-limiting device such as an overload clutch comprises first and second relatively rotatable torque members which are prevented from axial movement relative to each other and an intermediate member slidably mounted on the second torque member but secured for rotation therewith. The intermediate member makes driving contact with the first torque member by means of inclined driving faces on these two parts which are held in driving contact by detent members such as balls or plungers which are resiliently maintained in contact with an inclined sidewall of a step. When the torque applied to the device exceeds a predetermined value, the second clutch member drives the detent members up the step thereby permitting the driving torque to fully disengage the device. A relatively small force is used to reengage the device by pushing the intermediate torque member towards the first torque member until the detent members are urged down the step face to bring the device back into full engagement.

PATENTED DEC 15 1970 3,547,242

INVENTOR
GEORGE R. BRAGGINS
BY
Woodhams, Blanchard & Flynn
ATTORNEYS 3,547,242

TORQUE LIMITING DEVICES OR OVERLOAD CLUTCHES

BACKGROUND OF THE INVENTION

1. Field of the Invention

This invention relates generally to torque-transmitting devices and more particularly to torque-limiting devices.

For convenience, the invention will be described with reference to its application to overload-protection clutches for use in protecting driving or driven machines from damage resulting from overload. It will be readily apparent however that the invention may be applied to any other device where limitation of a torque to a predetermined maximum value is required.

2. Description of the Prior Art

In one form of prior art of overload clutch known to the applicant, the torque is transmitted from an input member to an output member through a ring of balls seated in pockets in surfaces of the two members, which are urged together by a spring. When the torque exceeds a predetermined value, the balls ride up the sides of their pockets and into the next pockets. Thereafter, the device continues to effectively slip or ratchet until the excessive torque is removed. Unless this is done very rapidly, rapid wear and damage to the clutch will render it useless for further service.

In other forms of prior art overload clutches known to the applicant, the clutch disengages completely when the applied torque exceeds the predetermined value and it is necessary to deliberately reengage the clutch before drive can be resumed. However in the known clutch constructions, special tools and/or large forces or torques are required to reengage the clutch. This is particularly disadvantageous and furthermore often dangerous in the case of clutches intended to transmit large torques. Moreover, it is often difficult to reestablish a predetermined angular relationship between the input and output of the clutch in the case where a special timing relationship is required.

It is accordingly an object of the invention to provide a torque-limiting device which will reliably transmit torques below a predetermined value, which will disengage with effective snap action on application of torques above the predetermined value and which will then remain disengaged until deliberately reengaged, in which the input may be rotated for an indefinite period relative to the output in the disengaged condition and which can be deliberately reengaged by the application of a force which is small compared with the driving forces between the device components when the device disengages.

SUMMARY OF THE INVENTION

According to the invention there is provided a torque-limiting device having novel means for preventing, at torques below a predetermined torque, separation of the inclined driving faces of first and intermediate torque members, the intermediate torque member being axially slidable on a second torque member but constrained for rotation therewith. According to a preferred feature of the invention, the said means comprise an inclined step on one of said intermediate and second torque members and at least one resiliently biassed detent member which resists separation of the first and intermediate torque members at torques below the predetermined value but which rides up and over the step to disengage the device when the torque exceeds a predetermined value.

Other objects and advantages of the invention will become apparent from the following description of presently preferred embodiments of the invention given by way of example only.

Figure 1:
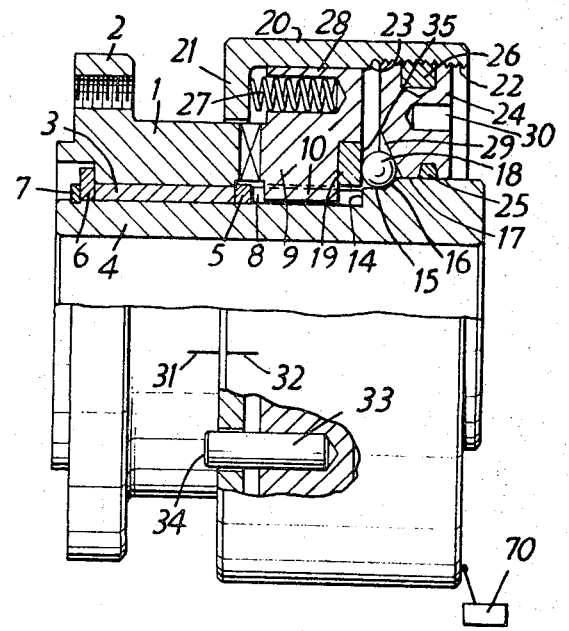
FIG. 1 is in part a side elevational view and in part an axial sectional view on an overload clutch according to the invention in the engaged or driving condition.
Figure 2:
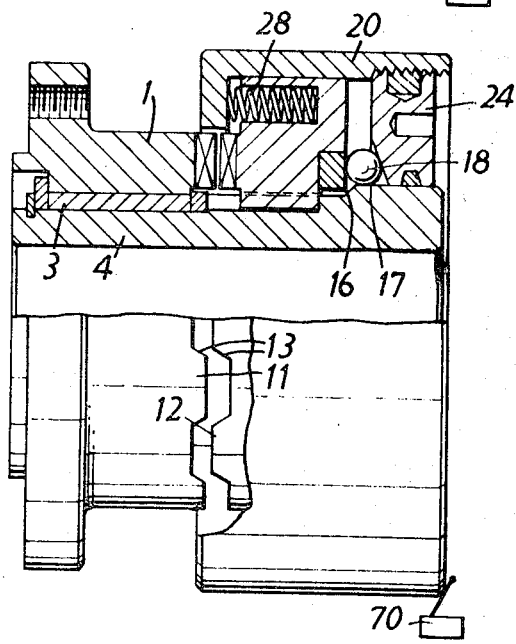
FIG. 2 shows the clutch of FIG. 1 in the disengaged condition.

Referring to the drawings, the overload clutch shown in FIGS. 1 and 2 comprises a hollow generally cylindrical first torque member 1 having a flange 2 by means of which it may be connected to a driving or driven shaft or other machine part in conventional manner. A bearing bush 3 is a press fit in the interior of the first torque member 1. Journaled in the bush 3 is a hollow cylindrical second torque member 4 which carries thrust rings 5 and 6 on either side of the bush 3, the thrust ring 6 being retained by a circlip 7 seated in a groove in the second torque member 4 while the thrust ring 5 bears against the end faces of a set of axial splines 8 borne on the outer surface of the second torque member 4. Thus axial movement between the first torque member 1 and the second torque member 4 is prevented by the thrust rings 5 and 6 which bear against coacting surfaces on the first torque member 1 in addition to the end faces of the sleeve 3.

An intermediate torque member 9 has internal splines 10 engages on the splines 8 of the second torque member 4. The first torque member 1 and the intermediate torque member 9 have interfitting driving jaw teeth 11 and 12 (FIG. 2) which have tapered or inclined driving faces as shown at 13. The intermediate torque member 9 is slidable between the engaged position shown in FIG. 1 in which the teeth 11 and 12 are in full engagement and a disengaged position shown in FIG. 2 in which free relative rotation can occur between the first torque member 1 and the intermediate member 9. Further movement of the intermediate member 9 beyond the disengaged position is prevented by abutment of the right-hand end surface of its splines 10 with a shoulder 14 on the outer surface of the second torque member 4.

Immediately to the right of the shoulder 14 (as seen in FIGS. 1 and 2) the outer surface of the second torque member 4 is formed with a first cylindrical surface portion 15, a frustoconical surface portion forming a step 16 and a second cylindrical portion 17 of greater diameter than the first cylindrical portion 15. Seated, in the engaged condition of the clutch as shown in FIG. 1, on the step 16 is a crowded ring of balls 18. The balls 18 also bear against a surface 35 of a hardened steel insert 19 in the end face of the intermediate torque member 9. the surface 35, as clearly shown in FIG. 2, extends at at an acute angle relative to the step surface 16.

The intermediate torque member carries an external sleeve or casing member 20 formed with an integral flange 21 at one end and internal screwthreads 22 at its other end, the screwthreads 22 terminating adjacent an undercut shoulder 23. An adjusting ring 24 forming a ball-control member has external screwthreads engaged in the screwthreads 22 and carries a seal 25 inset in its inner surface to permit the ring 24 to be slidably and sealingly supported on the second cylindrical surface 17, the seal 25 preventing the entry of dirt and contaminants into the interior of the clutch. A nylon grub screw or peg 26 in a seating in the ring 24 makes frictional contact with the screwthreads 22 to lock the ring 24 against vibration.

The sleeve 20 is slidable on the outer surface of the intermediate torque member 9 which is formed with a set of cylindrical spring pockets 27 which have their axes parallel to and equiangularly spaced around the axis of the clutch. Mounted in the spring pockets 27 are compression springs 28 which urge the sleeve 20 and, with it, the adjusting ring 24 to the left (as seen in the drawings).

The inner face of the adjusting ring is formed with a frustoconical ball-guide surface 29 which is held in contact with the balls 18 by the pressure of the springs 28. The ball-guide surface 29 thus exerts a resilient force on the balls 18 tending to retain them in contact with the insert 19 and thereby exerts a resilient force on the intermediate torque member 9 to urge it into toothed engagement with the first torque member 1. The value of this resilient force may be continuously adjusted by rotation of the adjusting member 24, for example by means of a tool engaged in blind holes 30. The range of adjustment thereby obtained may be increased by changing the number of springs 28 and by using springs of different strengths. Thus a very wide range of limiting torques can be obtained with a given clutch construction.

In operation, with for example, a motor shaft mounted in the second torque aie-inlet 4 and a load coupled to the first torque member 1, the motor will drive the load through the second torque member 4, splines 8, intermediate torque member 9, driving faces 13 and first torque member 1. Thus normal drive is maintained so long as the load torque is below a predetermined value. If the load torque exceeds this value, for example as a result of jamming, the driving forces between the faces 13 exert a sufficient axial load on the intermediate torque member 9 to overcome combined resistance offered by the springs 28 and the static friction between the driving faces 13 and the other clutch components. This axial load thus drives the balls 18 up the inclined step face 16, thereby wedging apart the adjusting ring 24 and intermediate torque member 9 against the force exerted by the springs 28. As soon as the balls 18 move on to the second cylindrical portion 17 from the inclined step portion 16, further movement of the intermediate torque member 9 takes place without requiring any further compression of the springs 28. Thus no further resistance is offered to separation of the intermediate torque member 9 from the first torque member 1 so that the overload torque acting through the driving faces 13 flings the intermediate torque member 9 completely out of toothed engagement with the first torque member 1. In this connection, it is preferred that the axial length of the inclined step portion 16 is less than the axial length of the driving faces 13 so that the balls 18 move on to the second cylindrical portion 17 while the driving faces 13 are still in contact over part of their face length. In this way a snap action disengagement is ensured. This snap action is enhanced by the change from static, and thus higher, friction to dynamic, and thus lower, friction between the various clutch components. With the clutch thus disengaged, as shown in FIG. 2, the second torque member 4 is driven continuously by the motor while the first torque member 1 is stationary. The intermediate torque member 9 rotates with the second torque member 4 together with the entire assembly of springs 28, sleeve 20, adjusting ring 24 and balls 18. This rotation may continue indefinitely without damage to the clutch components, the bearing 3 being of appropriate design for this purpose. It will be appreciated that as soon as the balls 18 have ridden up over the step portion 16 on to the second cylindrical portion 17, the springs 28 are unable to exert any force on the intermediate torque member 9 in the direction of clutch reengagement. Accordingly, there is then no force tending to reengage the clutch.

However when the fault in the load has been cleared with the motor stopped, the clutch may be reengaged simply by approximately realigning the jaws 11 and 12 and then pushing the sleeve 20 to the left (FIG. 2). This pushes the balls 18 along to the left so that they ride along the second cylindrical portion 17 on to the inclined step portion 16 whereupon the resilient force generated by the springs 28 pushes the intermediate member back into toothed engagement with the first torque member 1. It will be noted that this reengagement action does not require further compression of the springs 28 so that only a comparatively small force, sufficient to overcome friction, is required to reengage the clutch. If however there is a risk that vibration could cause the sleeve 20 to move of itself to the left while the motor is still running, the second cylindrical portion 17 may be formed with a shallow groove to act as a positive seating for the balls 18 or alternatively the cylindrical portion 17 may be replaced by a slight taper in the opposite direction to the slope of the step 16. A slightly greater reengagement force will then be necessary but this can still be much smaller than the axial force required to separate the intermediate torque member 9 from the first torque member 2.

Where it is essential that a predetermined angular relationship should exist between the input and output of the device air-inlet driving conditions, the correct relationship may be reestablished by rotating one of the first and second torque members 1 and 4 relative to the other to the required relative angular position before reengaging the clutch. For this purpose the first torque member 1 and the sleeve 20 may carry index marks 31 and 32 respectively. Moreover, a dowel pin 33 may be mounted in the intermediate member 9 and pass through an opening 34 in the flange 21 to prevent rotation between th sleeve 20 and the intermediate torque member 9. The dowel pin 33 will also prevent bending of and possible damage to the springs 28 during angular adjustment of the ring 24.

If desired the radially inner surface of the flange 21 may carry a seal similar to the seal 25 to prevent the entry of dirt or other contaminants. This seal (not shown) will cooperate with the outer surface of the first torque member 1.

Figure 3:
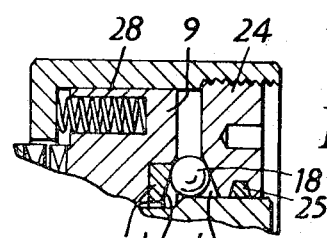
FIG. 3 shows a modification to a detail of FIG. 2.

FIG. 3 shows a modification of the clutch shown in FIGS. 1 and 2 which may be employed where it is desired to increase the predetermined value of the release torque without requiring an excessively large number of or strength for the springs 28. In this modification, the insert 19' in the intermediate torque member 9 has a frustoconical ball-engaging face 35' which may for example be inclined to the axis at the same angle as the surface 29 in which case the springs 28 have to be compressed through about twice the distance to allow the balls 18 to reach the second cylindrical surface 17. Thus, the value of the limit torque is increased for a given set of springs 28 and adjustment of the ring 24. Of course, if desired, the surfaces 29 and 35' may be inclined at dissimilar angles which will improve the snap action on reengagement.

Figure 4:
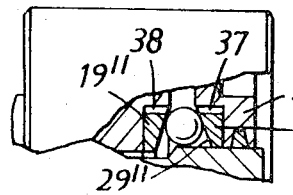
FIG. 4 shows a further modification.

FIG. 4 illustrates a modification which may be made to the clutch shown in FIG. 3 with a view to simplifying production of the clutches. This modification may also be made to the clutch shown in FIGS. 1 and 2. According to this modification, the frustoconical ball-contacting surface or surfaces are formed on a ring or rings which are mounted in the associated part or parts with a substantial radial clearance. Thus as shown in FIG. 4, the ball guide surface 29''. instead of being formed on the adjusting ring 24'' itself, is formed on a ball-control ring member 36 located in a depression formed in the adjusting ring 24''. A substantial clearance 37 is left between the outer periphery of the ring 36 and the wall of the depression to enable the ring 36 to float radially and take up its correction position in cooperation with the balls 18. Similarly, a substantial clearance 38 is left at the outer periphery of the ball-engaging ring member 19'' for the same purpose.

With this arrangement, the need to form frustoconical surface on the adjusting ring and intermediate torque members within close tolerances is avoided and full contact with the balls is ensured, resulting in a good ball loading condition and smooth release of the clutch.

Figure 5:
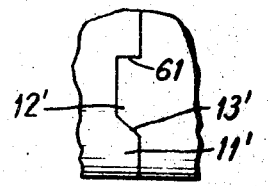
FIG. 5 shows a modification which may be made to any of the preceding FIGS.

FIG. 5 shows a modification which may be made to any of the clutches described above in which it is required that the clutch should disengage when the applied torque in one direction exceeds a predetermine value but which will remain in permanent engagement in the other direction of torque application regardless of the value of this torque. Such an arrangement may be required for example where both driving and braking forces are to be transmitted through the clutch.

In this modification, one side of each jaw tooth 11' is inclined as shown at 13' in the same manner as described above. However the other side faces 61 of these jaw clutch teeth are square so that when the torque is transmitted through the faces 61, no axial separation force will be developed between the intermediate torque member (9, 41 or 54) and the first torque member 1.

With any of the clutches described above, when the input torque is supplied by an electric motor, the axial movement of the intermediate member on disengagement of the clutch may be arranged to open a switch such as a microswitch to switch off the motor. Such a switch is indicated diagrammatically at 70 in FIGS. 1 and 2.

It has been found that a thin coating of a grease containing molybdenum disulphide on the inclined surfaces of the jaw teeth, and preferably on the other moving parts of the clutch release mechanism ensures consistency and smoothness of disengagement on overload.

It will be appreciated that while the invention is described above in detail in its application to overload clutches it may of course be applied to any other torque-limiting devices.

While several specific embodiments of the invention have been described and illustrated, it will be understood that these embodiments are merely for the purpose of illustration and description and that many other forms may be devised without departing from the scope of the invention as defined in the appended claims.

I claim:

1. A torque-limiting device comprising in combination:

first and second torque members rotatable about a common axis, and means axially locating said torque members relative to each other;

an intermediate torque member movable axially of said second torque member and connected for rotation therewith, said first and intermediate torque members each having a contacting force-transmitting surface, each said surface being inclined to a plane therethrough normal to said axis to generate an axial separation force between said first and intermediate torque member corresponding to a torque applied to said device;

step means on said second torque member, said step means facing said first torque member;

a ball-control member axially movable relative to said second torque member, said ball-control member having an annular ball-control surface;

said intermediate torque member having an annular ball-engaging surface axially spaced from and opposite said annular ball-control surface, said ball-engaging surface on said intermediate torque member being inclined at an acute angle relative to said step means;

a plurality of balls disposed in a ring around said second torque member in contact with said step means, said plurality of balls being maintained in contact with said annular ball-engaging surface and said annular ball-control surface; and resilient means urging said ball-control member towards said intermediate torque member to urge said balls down said step means and thereby to prevent separation of said first and intermediate torque members until the applied torque exceeds a predetermined value whereby said separation force drives said balls up over said step means for causing separation of said first and intermediate torque members.

2. A device according to claim 1, wherein said resilient means comprise a casing member engaged with said ball-control member and spring means acting between said intermediate torque member and said casing member, said spring means having a line of action substantially parallel with the axis of said device.

3. A device according to claim 2, wherein said spring means comprises a set of helical springs arranged in a ring, the axis of each of said springs being substantially parallel to the axis of said device, said springs bearing at one end against said intermediate torque member and at their other ends against said casing member.

4. A device according to claim 3, wherein said springs are located in pockets in said intermediate torque member and bear against an inwardly extending flange on said casing member, said pockets facing said first torque member.

5. A device according to claim 1, wherein said ball-engaging surface of said intermediate torque member is formed on a ball-engaging ring member carried by said intermediate torque member, said ball-engaging ring member being movable radially relative to said intermediate torque member.

6. A device according to claim 1, wherein said annular ball-control surface of said ball-control member is formed on a ball-control ring member which is carried by and movable radially relative to said ball-control member.

7. A device according to claim 6, wherein said ball-engaging surface of said intermediate torque member is formed on a ball-engaging ring member carried by said intermediate torque member, said ball-engaging ring member being movable radially relative to said intermediate torque member.

8. A device according to claim 1, wherein said second torque member is a sleeve, said step means being formed by an inclined surface interconnecting first and second cylindrical outer surface portions of smaller and larger diameter respectively, said second cylindrical surface being adjacent one end of said sleeve, said first torque member being rotatably mounted on said sleeve at the end thereof opposite said first cylindrical surface, said intermediate torque member being mounted for sliding movement on said sleeve between said first torque member and said first cylindrical surface, said intermediate torque member and said sleeve between said first torque member and said first cylindrical surface having interengaging noncylindrical profile means, said first and intermediate torque members having complementary clutch teeth, a generally cylindrical casing member slidable externally on said intermediate torque member, said casing member having an inturned flange directed inwardly toward said clutch teeth, said resilient means including a set of helical spring members disposed in spring pockets in said intermediate torque member facing said flange, said spring members bearing against said flange, and said casing member carrying said ball-control member.

9. A device according to claim 8, wherein said ball-control member has screwthreads engaged in coacting screwthreads in said casing member to permit adjustable tensioning of said spring members.

10. A device according to claim 1, wherein the ball-engaging surface formed on said intermediate torque member is tapered and extends at an acute angle relative to the axis of said device.

11. A device according to claim 1, wherein the ball-control surface formed on said ball-control member is tapered and extends at an acute angle relative to the axis of said device.

12. A device according to claim 11, wherein the ball-engaging surface formed on the intermediate torque member is tapered and extends at an acute angle relative to the axis of said device, the ball-engaging surface and the ball-control surface being tapered in opposite directions relative to the axis of said device so as to define therebetween an annular space which converges in a radially outward direction.